(12) United States Patent
Herrmann et al.

(10) Patent No.: US 10,408,649 B2
(45) Date of Patent: Sep. 10, 2019

(54) ULTRASONIC FLUID FLOW MEASURING USING AN OSCILLATING BODY AND A COUPLING PIECE HAVING A REDUCED CROSS SECTION THAN THE OSCILLATING BODY

(71) Applicant: SICK Engineering GmbH, Ottendorf-Okrilla (DE)

(72) Inventors: Volker Herrmann, Ottendorf-Okrilla (DE); Eric Starke, Ottendorf-Okrilla (DE); Christian Schulz, Ottendorf-Okrilla (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 189 days.

(21) Appl. No.: 15/489,986

(22) Filed: Apr. 18, 2017

(65) Prior Publication Data
US 2017/0336231 A1    Nov. 23, 2017

(30) Foreign Application Priority Data
May 19, 2016  (EP) ..................................... 16170299

(51) Int. Cl.
*G01F 1/66* (2006.01)
*G01F 15/18* (2006.01)
*G01H 3/00* (2006.01)

(52) U.S. Cl.
CPC .............. *G01F 1/662* (2013.01); *G01F 1/667* (2013.01); *G01F 15/185* (2013.01); *G01H 3/00* (2013.01)

(58) Field of Classification Search
None
See application file for complete search history.

(56) References Cited

U.S. PATENT DOCUMENTS

| | | | |
|---|---|---|---|
| 4,467,659 A | 8/1984 | Baumoel | |
| 5,090,252 A * | 2/1992 | Tschirner | G01F 1/662 73/861.28 |
| 6,895,823 B1 | 5/2005 | Herrmann et al. | |
| 7,902,968 B2 * | 3/2011 | Kojima | G10K 11/004 340/435 |

(Continued)

FOREIGN PATENT DOCUMENTS

| | | |
|---|---|---|
| DE | 3436232 A1 | 4/1985 |
| DE | 10229925 A1 | 1/2004 |

(Continued)

OTHER PUBLICATIONS

European Search Report dated Dec. 1, 2016 in corresponding European Patent Application No. 16170299.8.

*Primary Examiner* — Harshad R Patel
(74) *Attorney, Agent, or Firm* — Nath, Goldberg & Meyer; Jerald L. Meyer; Stanley N. Protigal

(57) ABSTRACT

The flow speed of a fluid (12) flowing in a conduit (14) is measured using at least one ultrasonic transducer (18a-b) that is attached to the conduit wall (22) from the outside The transducer (18a-b) has an oscillating body (34) that couples to a part region (32) of the conduit wall (22) that acts as a membrane of the ultrasonic transducer (18a-b) that can vibrate. A coupling piece (36) whose cross-section is smaller than the cross-section of the oscillating body (34) is arranged between the membrane (32) and the oscillating body (34).

13 Claims, 3 Drawing Sheets

(56) References Cited

U.S. PATENT DOCUMENTS

| | | | |
|---|---|---|---|
| 8,904,881 B2* | 12/2014 | Sonnenberg | G01F 1/662 |
| | | | 73/861.27 |
| 2007/0115102 A1 | 5/2007 | Nakano et al. | |
| 2007/0115758 A1 | 5/2007 | Kojima et al. | |
| 2008/0034887 A1* | 2/2008 | Rieder | G01F 1/662 |
| | | | 73/861.28 |
| 2015/0177036 A1* | 6/2015 | Speidel | G01F 1/66 |
| | | | 73/861.27 |
| 2016/0061778 A1 | 3/2016 | Kishiro et al. | |
| 2016/0153816 A1* | 6/2016 | Hayashi | G01F 1/662 |
| | | | 73/861.29 |

FOREIGN PATENT DOCUMENTS

| | | |
|---|---|---|
| DE | 10249542 A1 | 5/2004 |
| DE | 102006055168 A1 | 6/2007 |
| DE | 20 2013 105 800 | 4/2015 |
| EP | 1378727 B1 | 11/2005 |
| JP | 2000-337940 A | 12/2000 |
| JP | 2007142967 A | 6/2007 |
| JP | 2007147319 A | 6/2007 |

* cited by examiner

ULTRASONIC FLUID FLOW MEASURING USING AN OSCILLATING BODY AND A COUPLING PIECE HAVING A REDUCED CROSS SECTION THAN THE OSCILLATING BODY

FIELD

The invention relates to a measuring apparatus measuring apparatus for determining the flow speed of a fluid flowing in a conduit using at least one ultrasonic transducer that is attached to the conduit wall from the outside and that has an oscillating body that couples to a part region of the conduit wall that acts as a membrane of the ultrasonic transducer that can vibrate, and to a method for determining the flow speed of a fluid flowing in a conduit in which an ultrasonic transducer attached to the conduit wall from the outside and having an oscillating body that couples to a part region of the conduit wall that uses the part region as a membrane that can vibrate.

BACKGROUND

Different measurement principles are known for the determination of the flow speed or of the throughflow on an ultrasound basis. In a Doppler process, the frequency shift of an ultrasonic signal reflected at the flowing fluid that differs in dependence on the flow speed is evaluated. In a differential time of flight process, a pair of ultrasonic transducers is mounted with mutual offset in the longitudinal direction at the outer periphery of the conduit, said pair of ultrasonic transducers transmitting and registering ultrasonic signals alternatingly transversely to the flow along the measurement path spanned between the ultrasonic transducers. The ultrasonic signals transported through the fluid are accelerated or decelerated by the flow depending on the running direction. The resulting time of flight difference is calculated using geometrical parameters to form a mean flow speed of the fluid. The volume flow or throughflow results from this with the cross-sectional area. For more exact measurements, a plurality of measurement paths each having a pair of ultrasonic transducers can also be provided to detect a flow cross-section at more than one point.

The ultrasonic transducers used to generate the ultrasound have an oscillating body, frequently a ceramic material. An electric signal is, for example, converted into ultrasound, and vice versa, with its aid on the basis of the piezoelectric effect. Depending on the application, the ultrasonic transducer works as a sound source, as a sound detector or as both. In this respect, a coupling has to be provided between the fluid and the ultrasonic transducer. A widespread solution comprises allowing the ultrasonic transducer to project into the conduit with a direct contact to the fluid. Such intrusive probes can make exact measurements more difficult due to a disturbance of the flow. Conversely, the immersing ultrasonic transducers are exposed to the fluid and to its pressure and temperature and are thereby possibly damaged or lose their function due to depositions.

Techniques are generally also known in which the inner wall remains completely closed. One example is the so-called clamp-in assembly, for instance in accordance with U.S. Pat. No. 4,467,659 by which ultrasonic transducers are fastened to the conduit from the outside. However, only diametrical measurement paths can thus be implemented through the conduit axis, whereby additional errors are generated with non-axially symmetrical flow profiles.

U.S. Pat. No. 6,895,823, which corresponds to EP 1 378 727 B1, proposes attaching the ultrasound-generating elements to an outer side of a wall. Unlike the clamp-on technique, the ultrasonic transducer is in this respect so-to-say integrated into the wall. A pocket having a substantially smaller wall thickness than the remaining wall is formed in the region of the ultrasonic transducers and the remaining wall thickness forms the membrane of the ultrasonic transducer. This assembly, also known as clamp-in, is so-to-say an intermediate form between the fixed assembly in the inner space of the conduit and the clamp-on assembly. A relatively complicated multi-part transducer design is, however, used for this purpose. The radiating surface nevertheless remains too large for a radiation at higher frequencies.

JP 2000 337 940 A shows a further throughflow measuring apparatus in which the piezoelectric elements contact the conduit wall at the base of a bore in the conduit. The problems of a sufficiently broad radiation and of a simple transducer design are in this respect likewise not solved.

It is proposed in DE 102 48 542 A1 to attach the ultrasonic transducer directly to a functional surface that is in contact with the medium. A path alignment having a component in the flow direction is achieved by chamfering the functional surfaces and thus of the conduit. A planar, unimpeded inner conduit wall is thereby precluded.

It is therefore the object of the invention to provide an improved transducer concept for a measurement of flow speeds by means of ultrasound.

SUMMARY

This object is satisfied by a measuring apparatus method for determining the flow speed of a fluid flowing in a conduit using at least one ultrasonic transducer attached to a conduit wall from the outside. An oscillating body on the transducer couples to a part region of the conduit wall that acts as a membrane of the ultrasonic transducer that can vibrate. A coupling piece whose cross-section is smaller than the cross-section of the oscillating body is arranged between the membrane and the oscillating body.

The basis is the clamp-in principle explained supra. The ultrasonic transducer is therefore attached to the conduit wall from the outside and its oscillating body couples to a part region of the conduit wall. The oscillating body, for example a piezoceramic material, therefore uses the part region as a membrane. The invention then starts from the basic idea of arranging a coupling piece between the membrane and the oscillating body. This coupling piece is thinner, substantially thinner in a realistic application, than the oscillating body. The oscillating body is therefore seated on the conduit wall like a kind of stamp with the coupling piece and the coupling piece transmits ultrasound between the membrane and the oscillating body. This can take place in both directions depending on whether the ultrasonic transducer acts as a transmitter or as a receiver. It is the dimensions of the coupling piece that limit the size of the radiation surface by this design and not those of the oscillating body. A small transducer plate or effective membrane and a large oscillating body are therefore simultaneously made possible.

The invention first has all the advantages of the clamp-in technique, namely a high measuring accuracy similar to an intrusive process, but with the inner space simultaneously remaining completely unimpeded for the flow. The ultrasonic transducer integrated into the conduit wall allows a very wide radiation characteristic and non-diametrical measurement paths. The ultrasonic transducer has a simple design from a few parts in this respect and is suitable for mass production and can be manufactured inexpensively in small dimensions.

The oscillating body can preferably oscillate in the longitudinal and transverse directions. The oscillating body therefore utilizes additional degrees of freedom that are available to it by the arrangement on the thin coupling piece. Because the oscillating movement is reminiscent of shaking a pillow, the oscillating body is also called a pillow oscillator. A comparable oscillation is not possible at all with a conventional arrangement with a full-area connection of the lower side of the oscillating body to the conduit.

The coupling piece is preferably formed in one piece with the conduit wall. The coupling piece is an integral part of the conduit wall. There are accordingly no intermediate layers, no problems with the mechanical stability of the connection and there is ideal sound transmission.

The measuring apparatus preferably has a pocket that is attached in the conduit from outside and its base forms the membrane on which the coupling piece is arranged. The pocket has the result that the part region of the conduit wall forming the membrane is substantially thinner than the remaining conduit wall. The coupling piece is small in cross-section both with respect to the oscillating body and to the base of the pocket. The coupling piece is preferably a part of the conduit wall and remains in place when the pocket is formed.

The oscillating body is preferably at least partly arranged in the pocket. The oscillating body is even more preferably accommodated completely within the pocket. The coupling piece can thereby also remain comparatively short and the elements of the ultrasonic transducer are integrated in the conduit wall.

The pocket is preferably closed toward the outside by a transducer holder. The transducer holder is consequently a kind of cover of the ultrasonic transducer region. Access through this cover, for example for connection lines or data lines, remains possible, however.

The oscillating body is preferably elastically connected to the transducer holder. The oscillating body is thus held in a stable manner without restricting the oscillation movement. An elastomer layer can serve for this purpose, for example.

The pocket preferably has a cylindrical or frustoconical section. It can overall have the shape of a cylinder or of a truncated cone, but can also have a mixture of both. In addition, steps are conceivable, that is an abrupt change of the diameter in one or more vertical layers of the pocket.

The oscillating body is preferably of parallelepiped or cylinder shape. As already explained, the dimensions of the oscillating body are not determined by the radiation surface due to the coupling via the coupling piece. The oscillating body is preferably not only a thin ceramic material, but rather has an extent in a similar order of magnitude to its cross-sectional surface in the vertical direction. The oscillating body can also be built up of a plurality of individual layers.

The coupling piece preferably has a cylindrical or frustoconical section. The geometrical variations thus possible correspond to those of the pocket.

The fluid is preferably a liquid. Flow speeds of gases are typically measured using a clamp-in flowmeter. Ultrasonic frequencies are used with gases that also allow a realistic technical production implementation of the oscillating body and of a part region of the conduit wall acting as a membrane in a conventional design. The demands on the design are due to the fact that a wide radiation characteristic is only possible with radiation surfaces smaller than the wavelength. However, higher frequencies are required for liquids. A radiation surface of less than 4 mm with a residual wall thickness and gaps below 500 µm would then have to be reached. This problem is solved in accordance with the invention by the coupling piece and by the cancellation achieved therewith of the dependency of the dimensions of the oscillating body and the radiation surface or the special oscillation on the coupling piece.

The measuring apparatus preferably has at least two ultrasonic transducers that are disposed opposite one another with the flow therebetween and with an offset in the direction of flow and it has an evaluation unit that is configured to exchange ultrasonic signals between the ultrasonic transducers and to determine the flow speed with respect to a time of flight difference of ultrasound transmitted and received again with and against the flow. Only one ultrasound path is thus initially set up. Further ultrasound paths by additional ultrasonic transducers are also conceivable to detect an inhomogeneous or disturbed flow more precisely. The Doppler process is an example of an alternative measurement principle.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
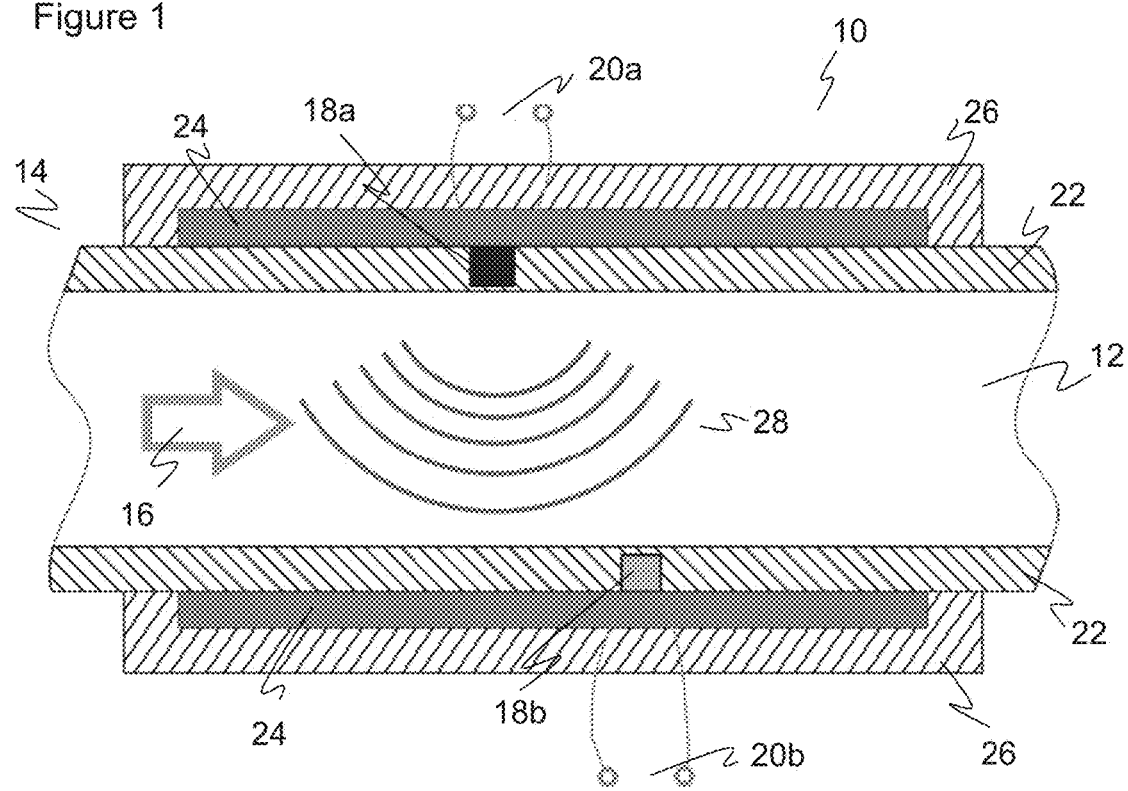
FIG. 1 a longitudinal sectional view of a measuring apparatus for determining the flow speed with ultrasonic transducers.

FIG. 1 shows a simplified longitudinal section view of a measuring apparatus 10 for determining the flow speed or the throughflow calculated therefrom of a fluid 12 in a tubular conduit 14 that flows in a direction marked by an arrow 16. The determination of the flow speed takes place, for example, using the differential time of flight method described in the introduction by evaluating the times of flight on a transmission and detection of ultrasonic signals between the pair of ultrasonic transducers 18a-b and against the flow in a control and evaluation unit. The control and evaluation device is not shown itself in FIG. 1, but is rather only indicated by its connections 20a-b to the ultrasonic transducers 18a-b. The number of ultrasonic transducers 18a-b can vary in other embodiments.

The conduit 14 in the region of the ultrasound measurement forms a measurement body of the measuring apparatus 10. The representation has been selected as if this measurement body were an integral part of the existing conduit 14. This is possible in principle, but in practice the measuring apparatus 10 is manufactured with its own measurement body that replaces a corresponding section of an existing conduit after the assembly and is for this purpose, for example, inserted at both sides by flange connections.

The ultrasonic transducers 18*a-b* are integrated in a conduit wall 22 of the conduit 14. This first corresponds to the clamp-in assembly explained in the introduction, but with a transducer concept in accordance with the invention that will be explained in more detail further below with reference to FIGS. 2 to 6. The ultrasonic transducers 18*a-b* are supported from the outside by a transducer holder 24. In this exemplary embodiment, the conduit 14 or the transducer holder 24 is surrounded right at the outside in the region of the measurement body by a housing or by a cover pipe 26.

As indicated by sound propagation lines 28, the outward and inward radiation directions of the ultrasonic transducers 18*a-b* are perpendicular to a center axis of the conduit 14. In order nevertheless to achieve an axial offset of the two ultrasonic transducers 18*a-b* and thus to achieve a measurement effect in a time of flight difference process, a broad radiation characteristic of, for example, more than 20° is required. At a higher ultrasonic frequency, in particular in the high kHz or even MHz range, this means a radiation surface whose diameter is only in the order of magnitude of a millimeter.

Instead of two ultrasonic transducers 18*a-b*, a plurality of pairs of ultrasonic transducers can also be provided that span a plurality of measurement paths between one another for a measurement apparatus 10 having a multi-path configuration. A more exact measurement is possible with an irregular flow or with upstream disturbances using such a multi-path counter that has a plurality of measurement paths offset with respect to one another and to the pipe axis. A single-path counter implicitly requires a homogeneous flow that can be detected by the single path or thereby only measures a first approximation of a complicated flow.

Figure 2:
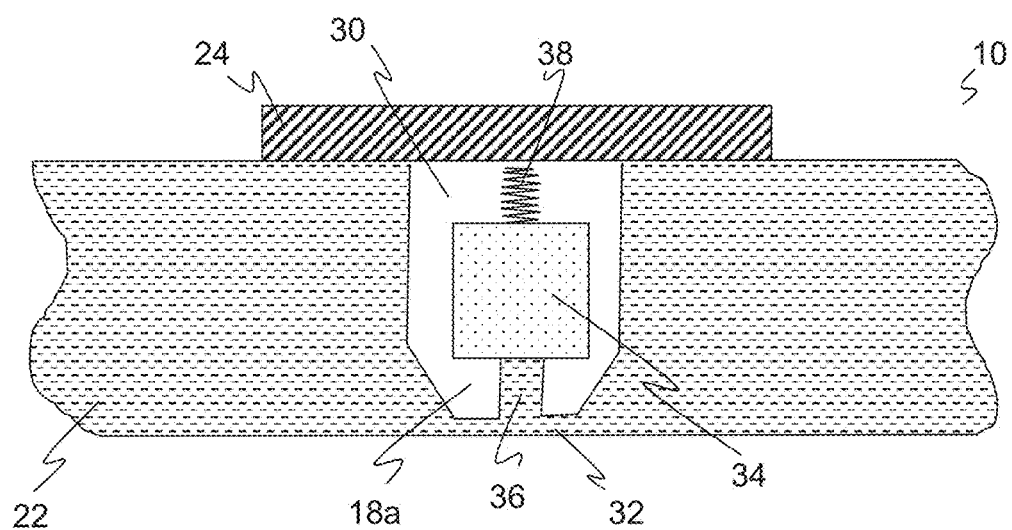
FIG. 2 a detailed view of an ultrasonic transducer region in FIG. 1.
Figure 3:
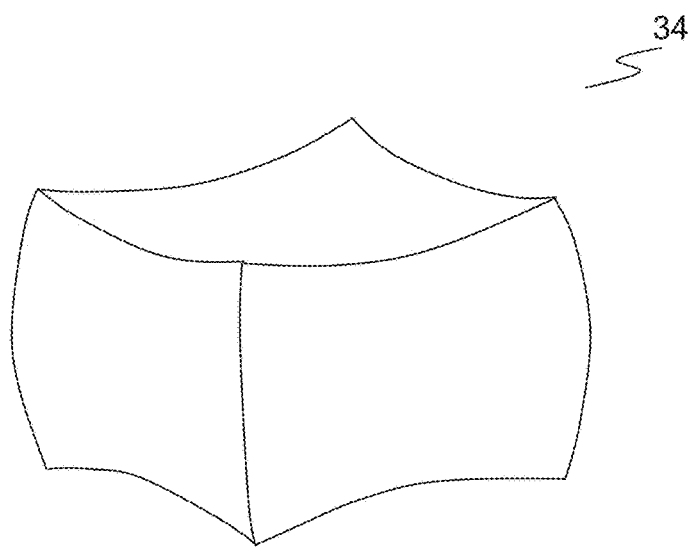
FIG. 3 a schematic three-dimensional representation of the oscillation of an oscillating body of an ultrasonic transducer.
Figure 4:
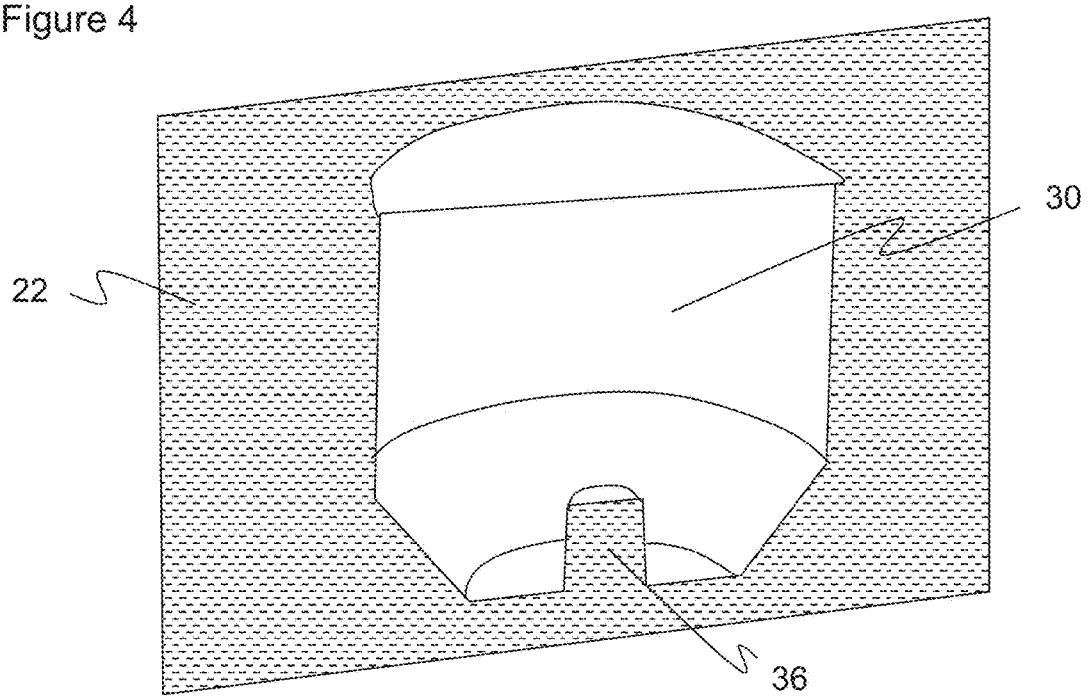
FIG. 4 a three-dimensional inner view of a pocket in the conduit wall for an ultrasonic transducer.

FIG. 2 shows the region of an ultrasonic transducer 18*a* in the conduit wall 22 in an enlarged representation to more exactly illustrate the improvement and simplification by the transducer principle in accordance with the invention. A hollow space or a pocket 30 is formed in the conduit wall 22 and is closed toward the outside by the transducer holder 24. A thin-wall part region 32 of the conduit wall 22 remains toward the inside in the region of the pocket; it simultaneously serves as a membrane of the ultrasonic transducer 18*a* and is excited to oscillate by its oscillating body 34, for example a piezoceramic material, to transmit an ultrasonic signal; or conversely, it is excited to oscillate on an impact of an ultrasonic signal from the interior of the conduit 14 on the part region 32 of the oscillating body 34. The thin-wall part region 32 remains stable enough to withstand an internal conduit pressure to be expected. The conduit wall 22 forms an inner surface closed in itself without recesses or projections that could disturb the flow or at which depositions could settle.

The oscillating body 34 is now not directly placed onto the part region 32 acting as a membrane. A coupling piece 36 is rather provided therebetween whose cross-sectional surface is much smaller than that of the part region 32 and of the oscillating body 34. The oscillating body 34 can be formed as a piezoelectric block that is placed directly onto the coupling piece 36. Both a direction connection between the oscillating body 34 and the coupling piece 36 and an additional coupling material are conceivable. In addition, the connection can only be established by a force-transmitting coupling, for instance by a clamping force from above, but also by adhesive bonding or soldering.

The coupling piece 36 is in turn preferably an integral element of the conduit wall 22 such that additional contact points are omitted. For this purpose, the pocket 30 and the coupling piece 36 are preferably formed together in an efficient production process and the coupling piece 36 is-so-to-say left in position in so doing. It should, however, not be precluded, despite the foreseeable disadvantages in the sound transmission and in the mechanical robustness, to fasten the coupling piece 36 to the base of the pocket 30 at the part region 32 as a separate element. The oscillating body is held in a yielding manner at the wall holder 24 toward the outside, which is represented by a spring 38. An exemplary practical implementation of the spring 38 is an elastomer layer. The force of the spring 38 can also establish or stabilize the connection between the oscillating body 34 and the coupling piece 36.

The coupling piece 36 makes possible a transducer plate or a radiation surface having a small diameter with a simultaneous utilization of a larger oscillating body 34. The possible dimensions of the oscillating body 34 and of the radiation surface become independent of one another due to the coupling piece 36. A larger oscillating body 34 is functionally advantageous both for the frequency configuration and for reaching the required sensitivity. As already addressed multiple times, a small radiation surface is actually required at higher frequencies for a wide radiation characteristic. These initially contradictory demands can be simultaneously satisfied by the coupling piece 36.

FIG. 3 again separately shows a schematic three-dimensional representation of the oscillating body 34 for explaining its oscillating behavior. The specific parallelepiped-shaped or cube-shaped geometry of the oscillating body 34 and equally the specific deformation by the oscillation are to be understood as exemplary. The oscillating body 34 carries out a special oscillation in operation that is illustratively called a pillow oscillation because it is reminiscent of a strongly shaken pillow due to the only small-surface fixing to the coupling piece 36 and due to its geometrical extent in the vertical direction and lateral direction. This can be understood as a volume resonance. While the oscillating body 34 becomes shorter in the longitudinal direction, that is in the vertical direction in FIG. 3, it thickens transversely at all sides. This is particularly pronounced at the lateral edges due to the block geometry. The shortening in the longitudinal direction is also not uniform, but is rather very highly pronounced at the center, while the corners move less. This oscillation is transmitted by the coupling piece 36 to the membrane or to the part region 32 or conversely the membrane sets the oscillating body 34 into oscillation via the coupling piece 36 on incident ultrasound.

The oscillating body 34 preferably works in a frequency range of some hundred kHz up to some MHz, with, however, the principle also working from a few kHz to at least ten MHz. The specific useful frequencies are fixed by the geometry and by the material such that it is considered on the configuration of the oscillating body 34. The oscillating body 34 is preferably operated at one of its resonances; the coupling piece 36 at its resonance or beneath its resonance. The resonance of the part region 32 can also selectively be used.

Figure 5:
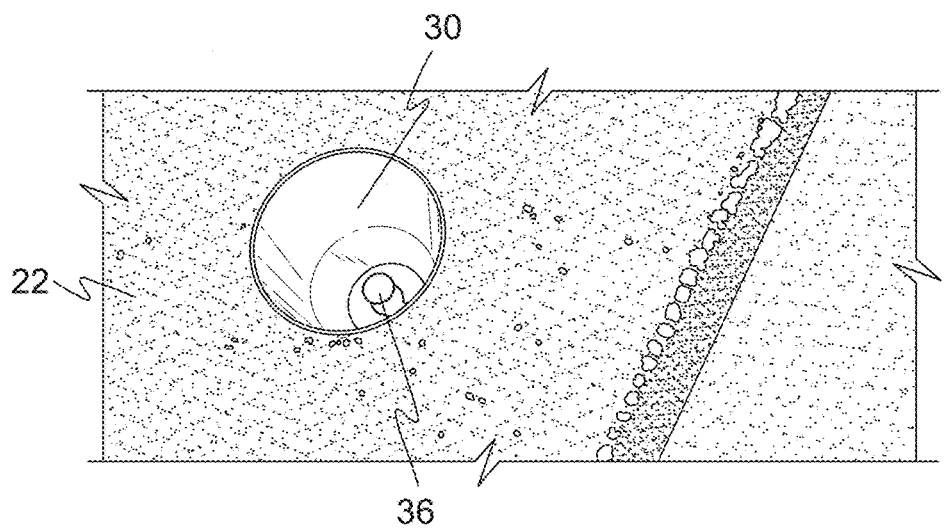
FIG. 5 an outer view of a pocket in the conduit wall for an ultrasonic transducer.

FIG. 4 again shows the pocket 30 with the coupling piece 36 in a three-dimensional sectional view. The pocket 30 is cylindrical in the upper region and tapers inwardly due to a frustoconical shape. The inner contour thereby reduces in the direction of the part region 32 that thus has a smaller surface than the cross-section in the upper region of the pocket 30 that can in particular also be smaller than the oscillating body 34 due to the coupling piece 36. The coupling piece 36 is of cylindrical shape in this embodiment. FIG. 5 shows a photograph of a conduit wall 22 having a prepared pocket 30 and coupling piece 36.

Figure 6:
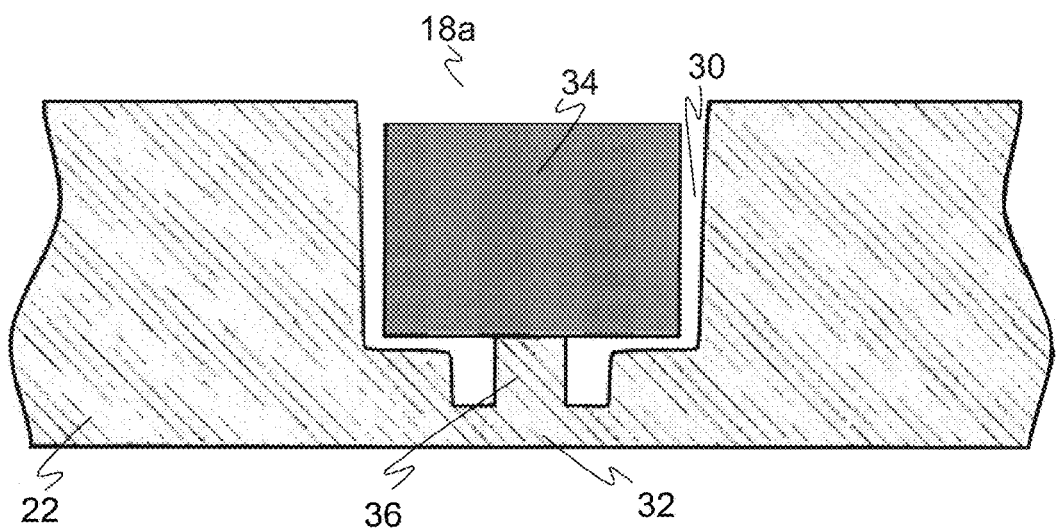
FIG. 6 a detailed view of an ultrasonic transducer similar to FIG. 2 for a geometrical variant of a pocket.

FIG. 6 again shows a longitudinal section of the measuring apparatus 10 in the region of an ultrasonic transducer 18a, similar to FIG. 2, but with a different geometry of the pocket 30. While the pocket 30 previously tapered conically toward the part region 30, a stepped configuration of the pocket with a larger cylinder diameter in the region of the oscillating body 34 and a small cylinder diameter in the region of the coupling piece 36 is shown in FIG. 6. These are only examples of the pocket geometry. The pocket 30 can also be cylindrical without any cross-sectional reduction, with more steps, with other combinations of cylinder sections and cone sections or in even other geometries. This also applies very much accordingly to the coupling piece 36; however, there the condition of a cross-sectional surface noticeably smaller with respect to the oscillating body remains in force. The shape of a cube, of a parallelepiped or of a cylinder can be considered for the oscillating body, for example.

The invention claimed is:

1. An ultrasonic flowmeter for determining the flow speed of a fluid flowing in a conduit, comprising:
    at least one ultrasonic transducer that is attached to a conduit wall from the outside and that has an oscillating body that couples to a part region of the conduit wall that acts as a membrane of the ultrasonic transducer that can vibrate; and
    a coupling piece configured in one piece with the conduit wall and having a cross-section smaller than the cross-section of the oscillating body, the coupling piece arranged between the membrane and the oscillating body,
    wherein the oscillating body can vibrate in longitudinal and transverse directions.

2. The ultrasonic flowmeter in accordance with claim 1, further comprising:
    a pocket attached in the conduit from the outside and whose base forms the membrane on which the coupling piece is arranged.

3. The ultrasonic flowmeter in accordance with claim 2, wherein the oscillating body is at least partly arranged in the pocket.

4. The ultrasonic flowmeter in accordance with claim 2, wherein the pocket is closed toward the outside by a transducer holder.

5. The ultrasonic flowmeter in accordance with claim 4, wherein the oscillating body is elastically connected to the transducer holder.

6. The ultrasonic flowmeter in accordance with claim 2, wherein the pocket has a cylindrical or frustoconical section.

7. The ultrasonic flowmeter in accordance with claim 1, wherein the oscillating body is of parallelepiped shape or cylinder shape.

8. The ultrasonic flowmeter in accordance with claim 1, wherein the coupling piece has a cylindrical or frustoconical section.

9. The ultrasonic flowmeter in accordance with claim 1, wherein the fluid is a liquid.

10. The ultrasonic flowmeter in accordance with claim 1, further comprising:
    at least two ultrasonic transducers disposed opposite one another with the flow therebetween and with an offset in the direction of flow; and
    an evaluation unit configured to exchange ultrasonic signals between the ultrasonic transducers and to determine the flow speed with respect to a time of flight difference of ultrasound transmitted and received again with and against the flow.

11. A method of determining the flow speed of a fluid flowing in a conduit using an ultrasonic flowmeter, in which an ultrasonic transducer attached to a conduit wall from the outside and having an oscillating body that couples to a part region of the conduit wall that uses the part region as a membrane that can vibrate is provided, wherein the oscillating body can vibrate in longitudinal and transverse directions, the method comprising the step of:
    transmitting ultrasound between the membrane and the oscillating body by a coupling piece whose cross-section is smaller than the cross-section of the oscillating body and formed in one piece with the conduit wall.

12. The method in accordance with claim 11, further comprising the step of:
    setting the oscillating body into an oscillation in longitudinal and transverse directions.

13. The method in accordance with claim 11, further comprising the step of:
    transmitting the ultrasound directly between the oscillating body and the conduit wall by the coupling piece formed in one piece with the conduit wall.

* * * * *